Figure 1:
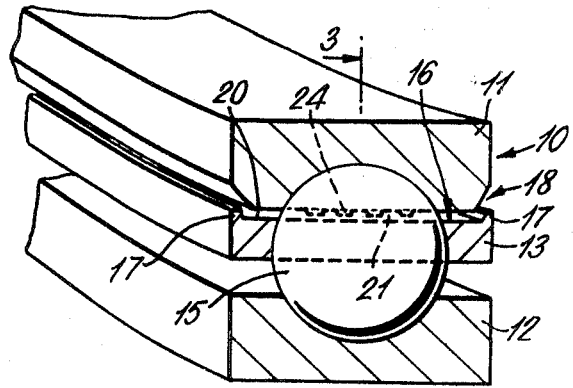

United States Patent

[11] 3,597,031

| | | | |
|---|---|---|---|
| [72] | Inventor | Arthur Bill |  |
|  |  | Derby, England |  |
| [21] | Appl. No. | 846,370 |  |
| [22] | Filed | July 31, 1969 |  |
| [45] | Patented | Aug. 3, 1971 |  |
| [73] | Assignee | Rolls-Royce Limited |  |
|  |  | Derby, Derbyshire, England |  |
| [32] | Priority | Aug. 29, 1968 |  |
| [33] |  | Great Britain |  |
| [31] |  | 41370/68 |  |

[54] BEARING
4 Claims, 4 Drawing Figs.

[52] U.S. Cl. .................................................. 308/187
[51] Int. Cl. .................................................. F16c 33/66
[50] Field of Search .......................................... 308/187, 201, 217

[56] References Cited
UNITED STATES PATENTS

| 2,838,348 | 6/1958 | Hamm .......................... | 308/187 |
| 3,195,965 | 7/1965 | Van Dorn ...................... | 308/187 |
| 3,276,827 | 10/1966 | Divers et al. .................. | 308/187 |

*Primary Examiner*—Martin P. Schwadron
*Assistant Examiner*—Frank Susko
*Attorney*—Cushman, Darby & Cushman ABSTRACT: The invention concerns a bearing comprising concentric, annular, inner and outer races between which there is concentrically disposed an annular cage having pockets within which are retained rolling elements which are in rolling engagement with the inner and outer races, the radially inner surface of the cage being provided both with at least one journal portion which engages the inner race and with lubricant reservoir means which communicate with the said pockets for the supply of lubricant thereto.

PATENTED AUG 3 1971　　　　　　　　　　　　3,597,031

ARTHUR BILL

By Cushman, Darby & Cushman
Attorneys

BEARING

This invention concerns a bearing.

According to the present invention, there is provided a bearing comprising concentric, annular, inner and outer races between which there is concentrically disposed an annular cage having pockets within which are retained rolling elements which are in rolling engagement with the inner and outer races, the radially inner surface of the cage being provided both with at least one journal portion which engages the inner race and with lubricant reservoir means which communicate with the said pockets for the supply of lubricant thereto and which comprises a plurality of angularly spaced-apart recess in the inner surface of the cage, one of the recesses being provided between each two adjacent pockets, each of the recesses being separated from each of its adjacent pockets by an axially extending land which engages the inner race, at least one of the lands being provided with at least one lubricant passage through which lubricant may pass from the recess to the respective pocket.

Preferably, only the trailing land, with respect to the direction of rotation of the cage, is provided with a said lubricant passage or passages, each of the other lands acting as lubricant barriers.

The invention also comprises a gas turbine engine which is provided with least one bearing as set forth above. Thus the engine may be a vertical lift engine.

The term "lift engine" is used in this specification to indicate an engine adapted to produce vertical lift forces on an aircraft independently of those generated aerodynamically by forward flight of the aircraft. For this purpose the engine may have a power to weight ratio of at least 12:1.

Figure 2:
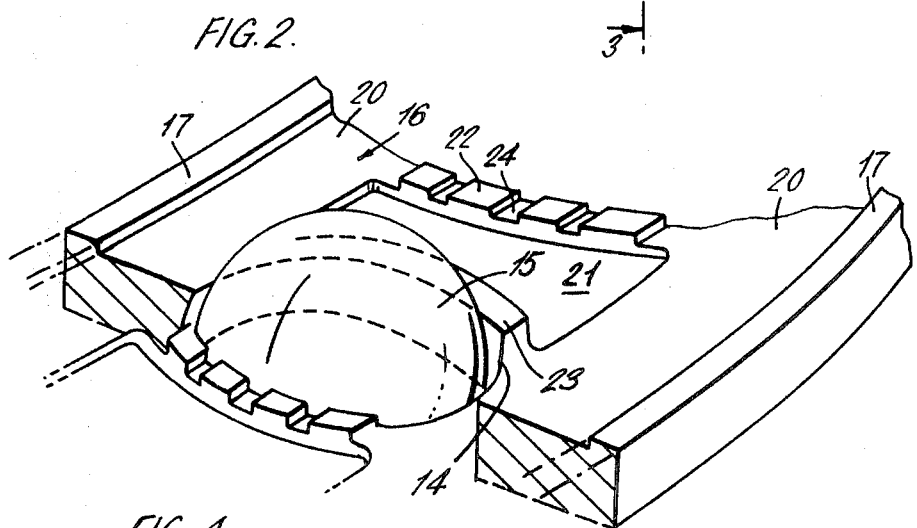
Figure 4:
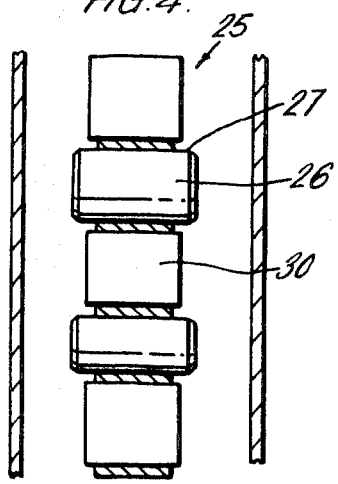
Figure 3:
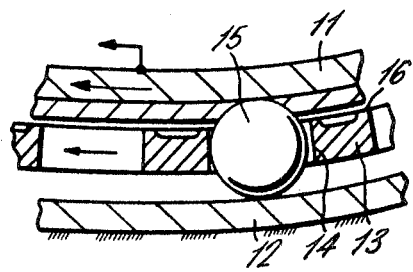

The invention is illustrated, merely by way of example, in the accompanying drawings, in which:

FIG. 1 is a diagrammatic sectional perspective view through a bearing in accordance with the present invention, FIG. 2 is a broken-away sectional perspective view of part of the structure of FIG. 1, FIG. 3 is a broken-away sectional view taken on the line 3–3 of FIG. 1, and FIG. 4 illustrates a developed plan view of an annular cross section taken in the plane of the inner surface of the cage of a modification of the bearing of the present invention.

Referring first to FIGS. 1 to 3, a gas turbine engine (not shown), e.g. a turbofan and/or vertical lift engine, has a main shaft (not shown) which carries the compressor(s) and turbine(s) of the engine and which is rotatably mounted within bearings, one of which is shown at 10.

The bearing 10 comprises concentric annular inner and outer races 11, 12 between which there is concentrically disposed an annular cage 13 having a plurality of angularly spaced-apart pockets 14 within which are retained balls 15 which are in rolling engagement with the inner and outer races 11, 12.

The outer race 12 is secured to fixed structure (not shown), while the inner race 11 is integral with, or otherwise fixedly connected with, the said shaft and is accordingly arranged to rotate clockwise as seen in FIG. 3. As will be appreciated, this will cause clockwise rotation of the cage 13.

The cage 13 has a radially inner surface 16 which is provided at each of its axially spaced edges with a flange 17, the said radially inner surface 16 having journal portions 20 which are engageable with the inner race 11. The radially inner surface 16 is cut away between the journal portions 20 to form lubricant transfer recesses and sludge traps 21, the lubricant from the recesses 21 being able to pass to the journal portions 20, to lubricate the latter, due to centrifugally developed pressure in the lubricating film.

The inner surface 16 is thus provided with a plurality of angularly spaced-apart recesses 21 which form lubricant reservoirs, a recess 21 being provided between each two adjacent pockets 14.

Lubricant (in the form of an oil jet or oil/air mist) is supplied, as indicated by arrow 18, to one or both sides of the cage 13 and to the space between a flange 17 and the inner race 11.

Each recess 21 is separated from its adjacent pockets 14 by axially extending lands 22, 23, the lands 22, 23 being respectively disposed on the trailing and leading edges of the recess 21. Each leading land 23 acts as a complete lubricant barrier preventing any lubricant in the recess 21 from passing directly to the respective pocket 14. Each of the trailing lands 22, however, is provided with a lubricant passage (or passages) 24 through which lubricant may pass from the recess 21 to the respective pocket 14.

In operation, lubricant is supplied, as indicated above, to the journal portions 20 and thus to the recesses 21. The journal portions 20 are thus lubricated, while the lubricant from each recess 21 is supplied to the respective pocket 14 so as to effect lubrication of the respective ball.

The bearing 10 is thus provided with a lubrication system in which substantially uniform quantities of lubricant are supplied to the journal portions 20 and pockets 14 which form the friction contact areas. Moreover, the bearing 10 is such that there will be relatively little loss of effective lubricant, which is an important feature where the bearing is employed in a lightweight lift engine. The bearing is also such that there will be adequate lubrication notwithstanding the fact that the flow of lubricant may be quite small. Moreover, since the lubricant is supplied to the inner surface 16, as opposed to the outer surface of the cage 13, lubrication is effected substantially immediately the lubricant is supplied to the bearing.

In FIG. 4, there is shown a developed plan view of an annular cross section taken in the plane of the inner surface of the cage of a bearing 25 which is generally similar to the bearing 10 and which for this reason will not be described in detail. The bearing 25, however, employs rollers 26, as opposed to balls, the rollers 26 being retained within pockets 27 of a cage of the bearing. A recess 30 of rectangular shape is disposed between each pair of adjacent pockets 27, the recesses 30 operating in substantially the same manner as the recess 21. At the ends of each recess 30 are the lands (shown in section) and defining the edges of the cage are the flanges (also shown in section).

I claim:

1. A bearing comprising: concentric annular inner and outer races; an annular cage disposed concentrically between said inner and outer races, said annular cage having angularly spaced-apart pockets; rolling elements retained in said pockets and in rolling engagement with said inner and outer races; said cage having a radially inner surface with at least one journal portion engaging said inner race; lubricant reservoir means provided on said cage and which communicates with said pockets for the supply of lubricant thereto, said lubricant reservoir means comprising a plurality of angularly spaced-apart recesses in said inner surface of said cage, one of said recesses being provided between each two adjacent pockets, each of said recesses being separated from each of its adjacent pockets by axially extending lands, at least one of said lands for each recess being provided with at least one lubricant passage through which lubricant may pass from the recess to the respective pocket.

2. A bearing as claimed in claim 1 in which only the trailing land, with respect to the direction of rotation of said cage, is provided with said at least one lubricant passage, each of the leading lands acting as lubricant barriers.

3. A bearing as claimed in claim 1 in which said rolling elements are balls.

4. A bearing as claimed in claim 1 in which said rolling elements are rollers.